United States Patent
Arnold (10) Patent No.: US 9,266,129 B2
(45) Date of Patent: Feb. 23, 2016

(54) GROVE SPRAYER

(71) Applicant: James R. Arnold, Clermont, FL (US)

(72) Inventor: James R. Arnold, Clermont, FL (US)

(73) Assignee: James R. Arnold, Clermont, FL (US)

( * ) Notice: Subject to any disclaimer, the term of this patent is extended or adjusted under 35 U.S.C. 154(b) by 28 days.

(21) Appl. No.: 14/013,944

(22) Filed: Aug. 29, 2013

(65) Prior Publication Data

US 2014/0001277 A1    Jan. 2, 2014

Related U.S. Application Data

(63) Continuation-in-part of application No. 12/927,131, filed on Nov. 9, 2010, now abandoned.

(51) Int. Cl.

| B05B 7/10 | (2006.01) |
|---|---|
| B05B 7/08 | (2006.01) |
| A01M 7/00 | (2006.01) |
| B05B 7/04 | (2006.01) |
| B05B 7/00 | (2006.01) |

(52) U.S. Cl.
CPC ............ *B05B 7/0861* (2013.01); *A01M 7/0014* (2013.01); *B05B 7/0475* (2013.01); *B05B 7/10* (2013.01); *B05B 7/0075* (2013.01)

(58) Field of Classification Search
CPC ..... A01M 7/0014; B05B 7/10; B05B 7/0075; B05B 7/0475; B05B 7/0861
USPC ............. 239/8, 290, 296, 399, 403, 405, 406, 239/418, 423, 424, 424.5, 425, 433, 434.5
See application file for complete search history.

(56) References Cited

U.S. PATENT DOCUMENTS

| 3,521,817 A | 7/1970 | Curtis et al. |
|---|---|---|
| 3,596,476 A | 8/1971 | Jakob et al. |
| 4,347,978 A | 9/1982 | Lenhardt |
| 4,546,923 A * | 10/1985 | Ii .................................... 239/406 |
| 5,002,227 A | 3/1991 | Ehrenberg |
| 5,522,544 A | 6/1996 | Gal |
| 6,032,407 A | 3/2000 | Conner |
| 2007/0194146 A1 * | 8/2007 | Dorendorf ................. 239/419.3 |

* cited by examiner

*Primary Examiner* — Jason Boeckmann
(74) *Attorney, Agent, or Firm* — Christopher & Weisberg, P.A.

(57) ABSTRACT

A nozzle and sprayer system for aerosolizing liquid for its even application to foliage. The frustoconical nozzle housing body defines a longitudinal axis, a wall, a proximal portion, and a distal portion, the housing wall at the distal portion being thicker than the housing wall at the proximal portion, and an air chamber defined by the housing wall of the proximal portion. The housing also defines a plurality of tapered air conduits that are spirally and radially arranged about the longitudinal axis that create a vortex in expelled air. The housing also defines a liquid conduit defining a bend. The outlets of the plurality of air conduits are radially arranged about the outlet of the liquid conduit, such that fluid ejected from the outlet of the liquid conduit into the vortex is sheared to create a fog or mist of small liquid particles suspended in air.

11 Claims, 6 Drawing Sheets

GROVE SPRAYER

CROSS-REFERENCE TO RELATED APPLICATION

This application is: related to and claims priority to U.S. patent application Ser. No. 12/927,131, filed Nov. 9, 2010, entitled GROVE SPRAYER, the entirety of which is incorporated herein by reference.

STATEMENT REGARDING FEDERALLY SPONSORED RESEARCH OR DEVELOPMENT n/a

FIELD OF THE INVENTION

The present invention relates to a sprayer assembly and an interchangeable nozzle that atomizes fluid to create a fog-like dispersal of the fluid.

BACKGROUND OF THE INVENTION

The application of treatment fluids, such as insecticides, fungicides and other crop treatment chemicals, including water and horticultural oils, to plants has been widely practiced for protection of the plants, including trees, row crops, nursery plants, and even residential plants. The highest distribution of insects and pathogens on a plant is commonly on the leaves, especially on the undersides of the leaves. However, it is generally very difficult to get adequate coverage of the undersides of the leaves when spraying the foliage with a fluid. For this purpose, fans or blowers are used which direct an open stream of air at high velocity into the plant foliage. This agitates the foliage to expose all leaf surfaces to the applied liquid. Although this may be effective for causing leaf movement, such a direct, high-velocity air stream may also damage tender leaves of plants that are sensitive to physical injury. As physical injury provides a point of entry for pathogens, this can result in significant crop loss or loss of the plant's aesthetic value.

In the past, there have been a wide variety of agricultural sprayers which are typically drawn by tractors, trucks or the like for spraying of liquid chemicals. Generally, prior art sprayers have large propellers or a number of propellers which create an air flow that carries the chemicals to the foliage. However, this type of prior art sprayer uses large amounts of chemical spray and does not always provide full or uniform coverage of the tree foliage. In addition, these sprayers generally spray at random while the trees vary in size, shape and distance between trees, requiring larger amounts of chemical sprays which increases the costs of spraying the trees while wasting chemicals and dispensing excess chemicals into the environment.

Additionally, commonly used sprayer systems include nozzles that are integrated with or otherwise permanently affixed to some part of the sprayer, such as a boom arm or the sprayer housing. Further, many systems have an integrated fan or air source for propelling the fluid onto the plants. Therefore, previously known systems require the applicator to have several complete sprayer units to apply a fluid to a variety of plant types. For example, an applicator may require both a sprayer system having nozzles affixed to a high, vertical boom arm and an integrated fan for spraying citrus trees, and a sprayer system having a low, horizontal boom arm without a fan for spraying delicate row crops such as berries and leafy greens.

Therefore, it is desired to provide a sprayer assembly that aerosolizes an applied fluid and allows for the application of a fluid to any of a variety of targets (for example, plants, buildings, open areas, ponds, or the like), even without a fan for propelling the aerosolized fluid from the sprayer assembly. It is further desirable to provide an interchangeable nozzle that aerosolizes an applied fluid and that may be used with any of a variety of sprayer types, even without a fan for propelling the aerosolized fluid from the nozzle.

SUMMARY OF THE INVENTION

The invention relates to a nozzle and method for aerosolizing liquid for its even application to foliage, to buildings, toward open areas, or to or toward other target objects. In one embodiment, the nozzle may generally include a frustoconical body defining a wall, a proximal portion, a distal portion, a longitudinal axis, and a face at the distal portion that is substantially orthogonal to the longitudinal axis, the body wall at the distal portion being thicker than the body wall at the proximal portion; a plurality of air conduits defined by the body wall of the distal portion and arranged about the longitudinal axis, each air conduit having an inlet and an outlet; and a liquid conduit defined by the body wall of the distal portion and having an inlet and an outlet, the outlets of the plurality of air conduits being radially disposed about the outlet of the liquid conduit on the face of the body, each air conduit inlet being radially offset from a corresponding air conduit outlet. The inlet of each air conduit may be located a first radial distance from the longitudinal axis and the outlet of each air conduit may be located a second radial distance from the longitudinal axis, the first distance being greater than the second distance. The liquid conduit may define a bend, and the liquid conduit may be substantially orthogonal to the longitudinal axis between the liquid conduit inlet and the elbow bend. Further, the liquid conduit may be substantially coaxial with the longitudinal axis between the elbow bend and the liquid conduit outlet. The nozzle may further include a liquid ejection element that is removably attached to the outlet of the liquid conduit, and the inlet of the liquid conduit may be disposed within a lateral surface of the body. The nozzle may further include an air chamber defined by the proximal portion of the body wall. The nozzle body may further define a nozzle opening that is distal of the face, and may further define one or more attachment tabs that radially protrude from the body. Additionally, the nozzle may include a second plurality of air conduits defined by the body wall of the distal portion of the body, each of the plurality of second air conduits having an inlet and an outlet, the outlets of the plurality of second air conduits being radially disposed about the outlet of the liquid conduit. The outlets of the plurality of second air conduits may define a circumference about the outlet of the liquid conduit that is less than a circumference defined about the outlet of the liquid conduit by the outlets of the plurality of first air conduits. Further, the inlet and the outlet of each of the plurality of second air conduits may be equidistant from the longitudinal axis and each of the plurality of second air conduits may include an inlet that is circumferentially offset from the outlet.

In another embodiment, the nozzle may generally include a body defining a longitudinal axis, a wall, a proximal portion, and a distal portion, the body wall at the distal portion being thicker than the body wall at the proximal portion, the body being tapered from the proximal portion to the distal portion; an air chamber defined by the body wall of the proximal portion; a plurality of air conduits defined by the body wall of the distal portion, each of the plurality of air conduits defining an air conduit inlet at a first radial distance from the longitudinal axis and defining an air conduit outlet at a second radial distance from the radial axis, the first radial distance being greater than the second radial distance, each of the air outlets being radially disposed about the longitudinal axis and each air conduit having an inlet that is radially offset from the outlet, each of the air conduits being tapered from the air conduit inlet to the air conduit outlet; and a liquid conduit defined by the body of the distal portion, the liquid conduit defining a liquid conduit inlet, a liquid conduit outlet, and an elbow bend, the portion of the liquid conduit between the liquid conduit inlet and the elbow bend being substantially orthogonal to the longitudinal axis and the portion of the liquid conduit between the elbow bend and the liquid conduit outlet being substantially coaxial with the longitudinal axis, the outlets of the plurality of air conduits being radially arranged bout the outlet of the liquid conduit.

The method for aerosolizing a liquid may generally include providing a nozzle, the nozzle including: a frustoconical body defining a longitudinal axis, a wall, a proximal portion, and a distal portion, the body wall at the distal portion being thicker than the body wall at the proximal portion; an air chamber defined by the body wall of the proximal portion; a plurality of air conduits defined by the body wall of the distal portion and being in communication with the air chamber, each air conduit having an inlet and an outlet; and a liquid conduit defined by the body wall of the distal portion and having an inlet at a first radial distance from the longitudinal axis and an outlet at a second radial distance from the longitudinal axis, the first radial distance being greater than the second radial distance, the outlets of the plurality of air conduits being radially disposed about the outlet of the liquid conduit, inlet of each of the plurality of air conduits being radially offset from the outlet of the air conduit; expelling liquid from the liquid conduit outlet; and expelling air from the outlets of the plurality of air conduits, the plurality of air conduits rotationally expelling the air into the liquid. The body may further include a plurality of propellant conduits defined by the body wall of the distal portion, each of the propellant conduits having an inlet and an outlet, the outlets of the plurality of propellant conduits being radially disposed about the outlet of the liquid conduit. The outlets of the plurality of propellant conduits may define a first circumference about the outlet of the liquid conduit and the outlets of the plurality of air conduits may define a second circumference about the outlet of the liquid conduit, the first circumference being smaller than the second circumference, and the inlet and the outlet of each propellant conduit being equidistant from the body longitudinal axis. Additionally, the liquid conduit defines an elbow bend, the portion of the liquid conduit between the liquid conduit inlet and the elbow bend being substantially orthogonal to the longitudinal axis and the portion of the liquid conduit between the elbow bend and the liquid conduit outlet being substantially coaxial with the longitudinal axis.

BRIEF DESCRIPTION OF THE DRAWINGS

Other objects, features, and advantages of the present invention will be apparent from the written description and the drawings in which.

DETAILED DESCRIPTION OF THE INVENTION

The following detailed description should be read with reference to the drawings in which similar elements in different drawings are numbered the same. The drawings, which are not necessarily to scale, depict illustrative embodiments and are not intended to limit the scope of the invention. Referring now to FIGS. 1-4, a first embodiment of an aerosolizing nozzle 10 is shown. The nozzle 10 may be suitable for aerosolizing a fluid to be applied to a plant, even in the absence of a fan or other air distribution means for propelling the aerosolized fluid from the nozzle 10. The nozzle 10 may generally include a housing 12 that defines a liquid conduit 14, a compressed air inlet chamber 16, and a plurality of vortex-generating air conduits 18.

Figure 3:
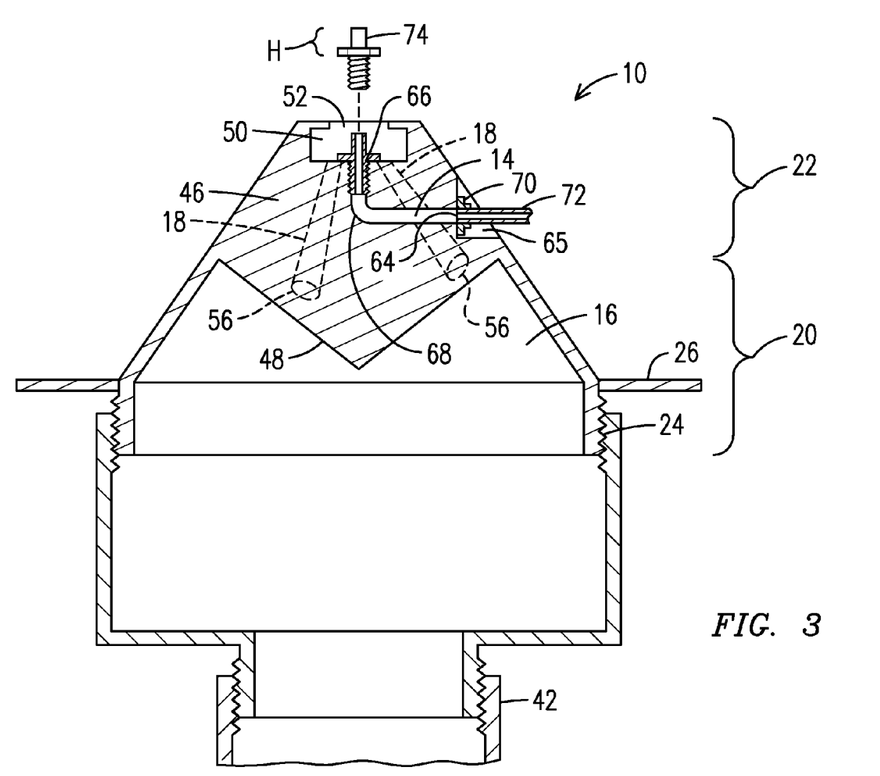
FIG. 3 shows a cross-sectional view of the first embodiment of an aerosolizing nozzle.
Figure 4:
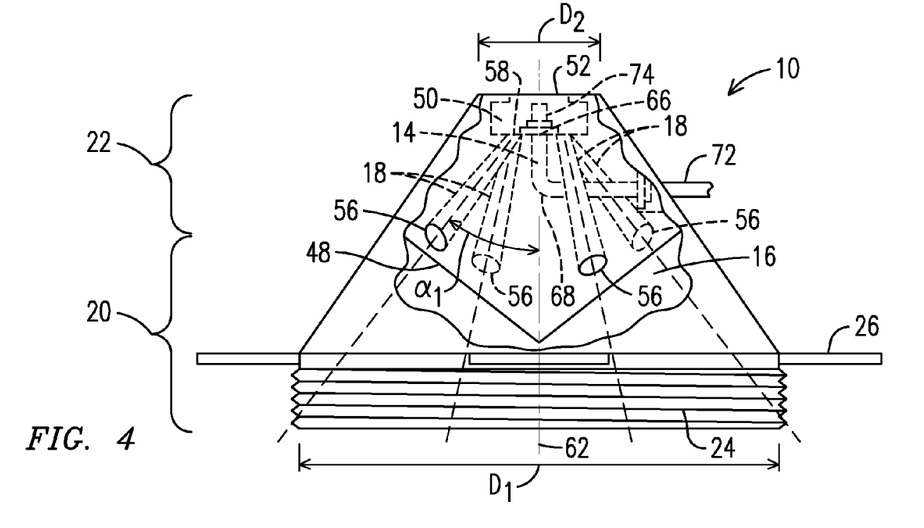
FIG. 4 shows a partial cross-sectional view of the first embodiment of an aerosolizing nozzle.
Figure 5:
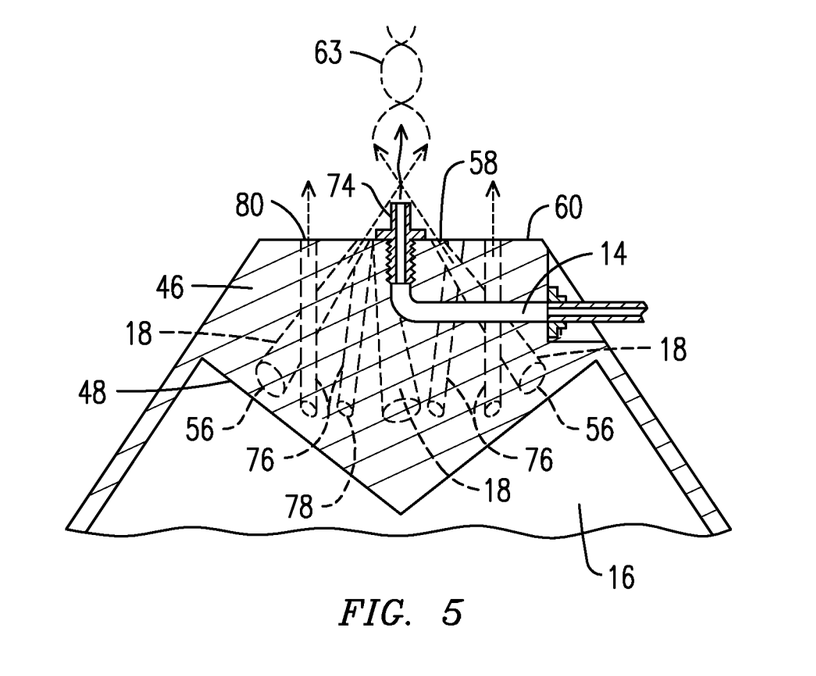
FIG. 5 shows a cross-sectional view of a portion of a second embodiment of an aerosolizing nozzle.
Figure 6:
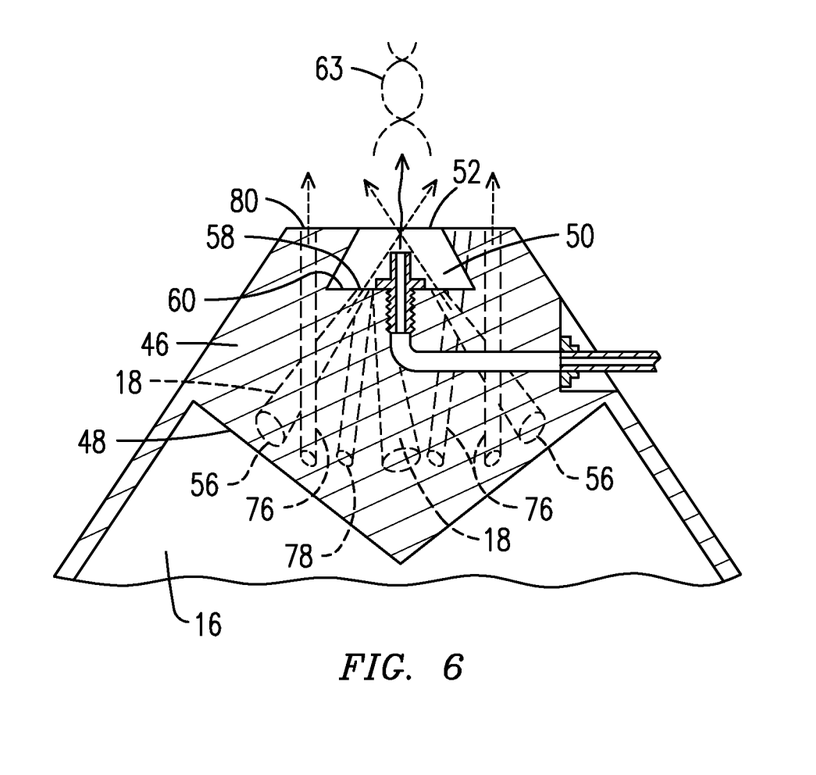
FIG. 6 shows a cross-sectional view of a portion of a third embodiment of an aerosolizing nozzle.

The nozzle housing 12 may include a proximal portion 20 and a distal portion 22. The nozzle housing 12 may have a frustoconical shape, the housing 12 tapering from a proximal portion 20 having a larger diameter $D_1$ to a distal portion 22 having a smaller diameter $D_2$. The proximal portion 20 may include a threaded portion 24 and one or more attachment tabs 26. Alternatively, the proximal portion 20 may include a locking mechanism (such as a cam lock, quick connect, or breakaway attachment means) rather than threading. As shown in FIG. 3, for example, the threading, or other attachment means, on the proximal portion 20 of the nozzle housing 12 may be used to attach the nozzle housing 12 to a base, a hose or conduit, or other component of a sprayer system 38, such as a compressed air feed line. Therefore, the nozzle housing 12 may be quickly attached and removed from the sprayer system 38 for easy repair, nozzle replacement, and nozzle repositioning. Further, this feature facilitates the use of any of a variety of aerosolizing nozzles described herein, based on the material to be sprayed. For example, a first aerosolizing nozzle (as shown in FIG. 3) may be replaced with a second aerosolizing nozzle (as shown in FIG. 5 or 6) if the applicator is transitioning between treating delicate row crops and treating tall trees.

Figures 8, 9:
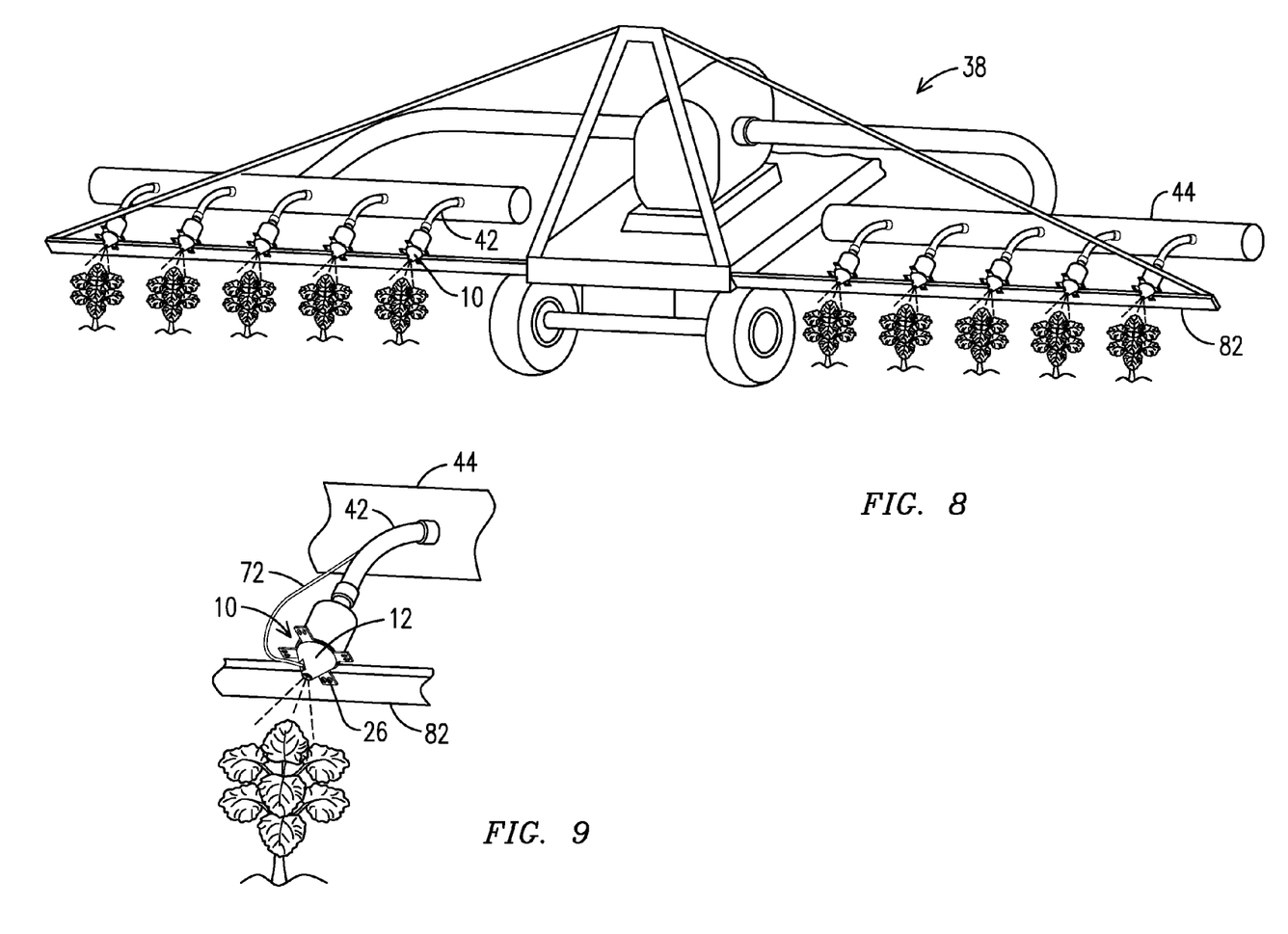
FIG. 8 shows a first exemplary embodiment of a sprayer assembly including aerosolizing nozzles.
FIG. 9 shows a close-up view of a nozzle included in a sprayer assembly.
Figures 10, 11:
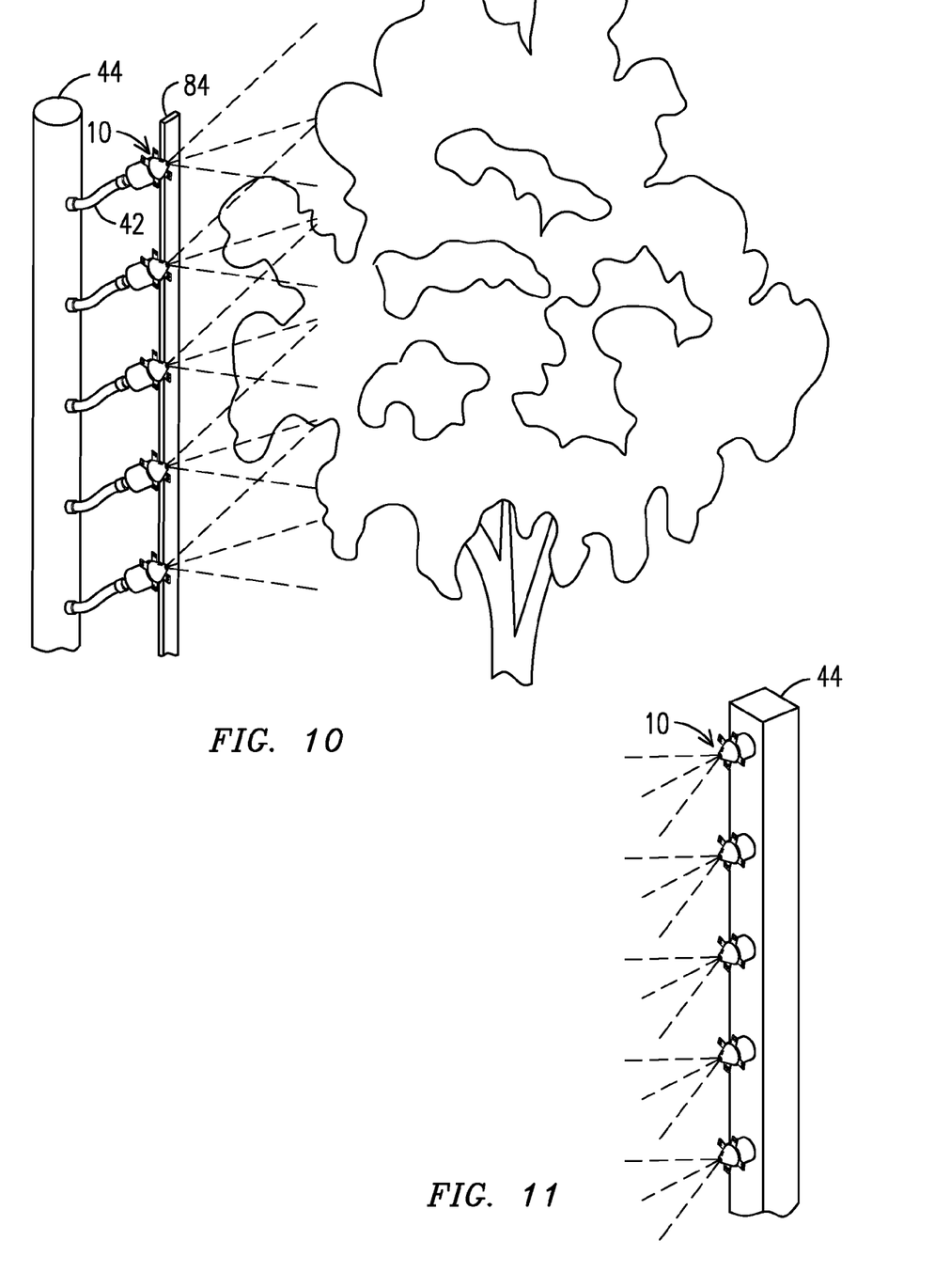
FIG. 10 shows a second exemplary embodiment of a sprayer assembly including aerosolizes nozzles.
FIG. 11 shows a partial view of a third exemplary embodiment of a sprayer assembly including aerosolizing nozzles.

The one or more attachment tabs 36 may include one or more screw holes or apertures 40 to accommodate fixing means, such as screws, nails, pegs, dowels, or the like for attaching the nozzle 10 to a component of the sprayer system 38 (for example, as shown in FIG. 8-10). Further, the proximal portion 20 may include a compressed air inlet chamber 16 that is the entry point for compressed air from, for example, an air feed line 42 (as shown in FIGS. 3 and 8-10) or from an air containment compartment or manifold 44 (as shown in FIG. 11). The distal portion 22 of the nozzle housing 12 may include a thick-walled area 46 that abuts the compressed air inlet chamber 16 (also referred to as a plenum) and that may define a concave roof portion 48 of the compressed air inlet chamber 16 (as shown in FIG. 3). Further, the distal portion 22 may include a distal compartment 50, which may be recessed within the distal portion 22 of the housing 12 and may include a lipped nozzle outlet 52 (for example, as shown in FIG. 3). From the compressed air inlet chamber 16, the air may enter the plurality of vortex-generating air conduits 18. Although four air conduits 18 are shown in the figures, more or less than four may be included. As a non-limiting example, two or six air conduits may be included.

Figure 1:
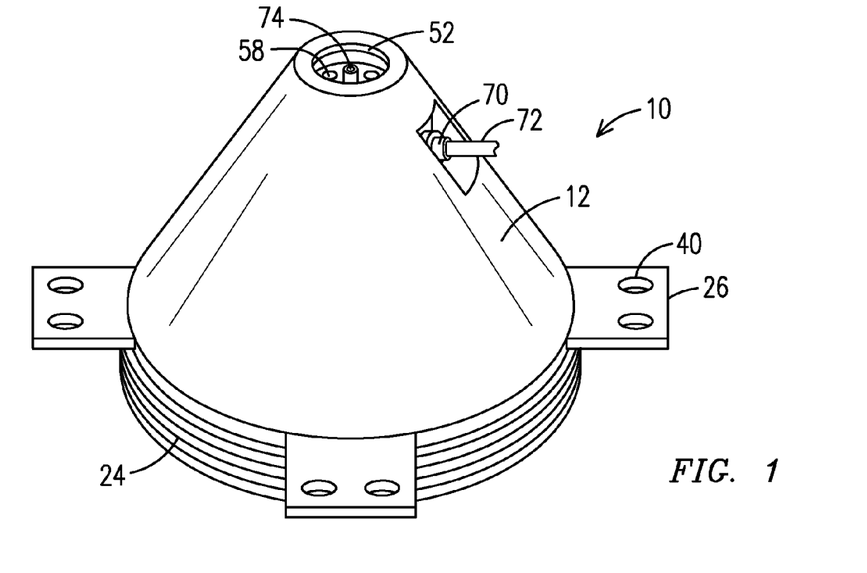
FIG. 1 shows a perspective view of a first embodiment of an aerosolizing spray nozzle.
Figure 2:
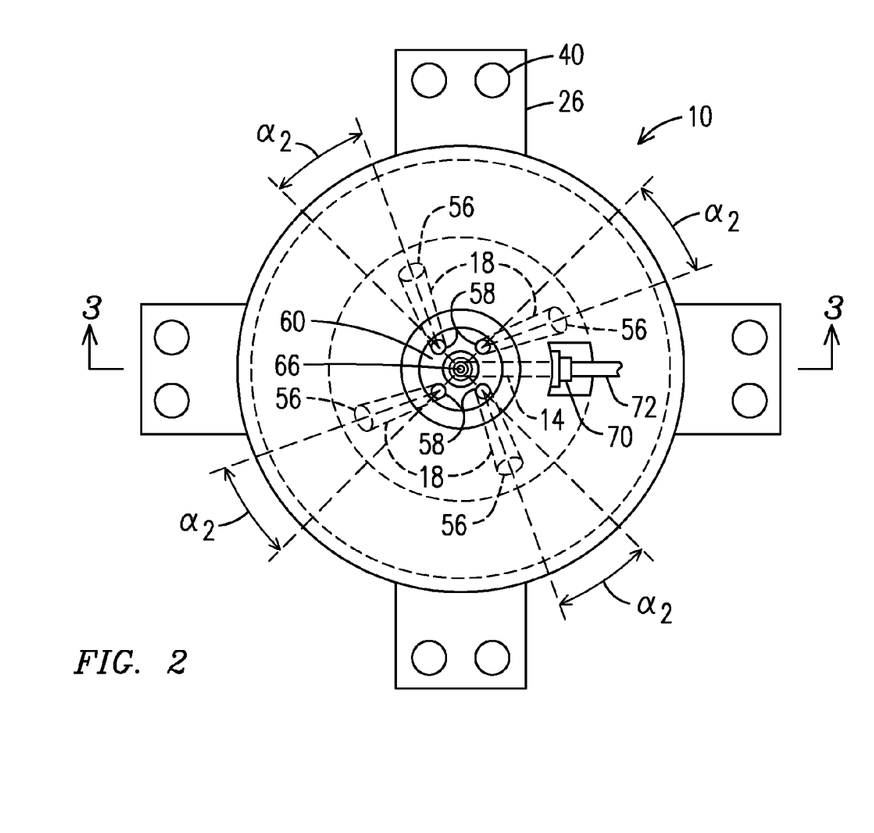
FIG. 2 shows a top view of the first embodiment of an aerosolizing nozzle.

The air conduits 18 may be machined into or otherwise define a negative space in the thick-walled portion 46 of the housing 12. The air conduits 18 may be in fluid communication with the compressed air inlet chamber 16, which may be in fluid communication with a source of compressed air. For example, the air may be delivered from the compressed air source to the compressed air inlet chamber 16 at a pressure of between approximately 4 psi and approximately 7 psi (for example, air pressure may be increased with the viscosity of the spray material). Each of the air conduits 18 may be tapered from an inlet 56 having a larger diameter to an outlet 58 having a smaller diameter. The nozzle 10 may include a distal face 60 in which the air conduit outlets 58 are located, and the face 60 may be located within the compartment 50 of the distal portion 22 of the housing 12, proximate the nozzle outlet and positioned substantially orthogonally to the longitudinal axis 62 of the nozzle housing 12. That is, the face 60 may be recessed relative to the nozzle outlet 52 (for example, as shown in FIG. 3). Further, each air conduit 18 may be canted toward the longitudinal axis 62 of the nozzle housing 12 by a degree between approximately 25° and approximately 60° (shown in FIG. 4 as angle $\alpha_1$). That is, the inlet 56 and outlet 58 of each air conduit 18 are each located a radial distance from the longitudinal axis 62, with the inlet 56 being located a greater radial distance from the longitudinal axis 62 than the outlet 58. This inward cant toward the longitudinal axis 62 facilitates the creation of a vortex 63 (that is, a spiraling turbulent flow of air) as the air exits the outlets 58 of the air conduits 18. The air conduits 18 may be configured such that air is directed through the air conduits 18 and generally toward the longitudinal axis 62. Further, although the air conduits 18 generally have a radial orientation about the longitudinal axis 62 of the nozzle, the air conduits 18 may be arranged about the longitudinal axis 62 such that, when viewed from above, each air conduit inlet 56 is radially offset from the corresponding air conduit outlet 58 (for example, as shown in FIG. 2). For example, the an air conduit inlet 56 may be offset from the radial direction between the corresponding air conduit outlet 58 and the fluid outlet by between approximately 5° and approximately 45° (shown in FIG. 2 as angle $\alpha_2$). Thus, opposing pairs of air conduit outlet 58s do not expel air directly at each other or the stream of exiting liquid. That is, each air conduit 18 may approach (in an inlet-to-outlet direction) the longitudinal axis 62 of the nozzle at an angle that is less than 90° (for example, as shown in FIG. 2). This acutely angular approach, like the cant described above, further facilitates the generation of a vortex 63 by rotationally expelling the air as it exits the nozzle. Additionally, the air conduits 18 are positioned such that approximately 50% of the diameter of the air stream exiting each air conduit 18 impinges upon or crosses the stream of fluid exiting the liquid conduit 14, which may also contribute to the vortex generation. Conversely, currently known sprayer systems expel air directly at the liquid as it exits that nozzle. Although this may be effective to aerosolize the liquid, it does not project the aerosolized liquid a forward direction and, consequently, large fans must be used to help the aerosolized liquid reach the target plants. Such fans not only add to the weight and cost of a sprayer system, but can also be bulky, loud, and damaging to delicate foliage.

The distal portion 22 of the nozzle housing 12 may define the liquid conduit 14. Like the air conduits 18, the liquid conduit 14 may be machined into or otherwise define a negative space in the thick-walled portion 46 of the housing 12 without including additional components. The liquid conduit 14 may include an inlet 64 located in a recessed area 65 within the thick-walled portion 46 of the housing 12 and an outlet 66 located on the distal face 60. Within the housing 12, the liquid conduit 14 may have bend 68, such as an elbow bend, that is substantially 90° (for example, 90°±5°), such that the portion of the liquid conduit 14 between the inlet 64 and the bend 68 is oriented substantially orthogonal to the longitudinal axis 62, and the portion of the liquid conduit 14 between the bend 68 and the outlet 66 is oriented substantially coaxial with the longitudinal axis 62. A coupling 70 may be attached to the inlet 64 of the liquid conduit, and a liquid feed line 72 may be removably attached to the coupling 70. For example, the liquid feed line/coupler interface may be threaded, a breakaway connection, or an interlocking mechanism. Further, a removable and interchangeable liquid ejection nipple 74 for ejecting liquid into the air vortex 63 may be removably coupled to the liquid conduit outlet 66. For example, the nipple 74 and at least a portion of the fluid conduit may be threaded such that the nipple 74 may be screwed into the outlet 66 of the liquid conduit 14. A nipple having a smaller diameter may be used for ejecting less fluid and/or fluid with a lower viscosity than a nipple having a larger diameter. Additionally, nipple having a smaller diameter may be used to produce a fog-type body of aerosolized liquid and a nipple having a larger diameter may be used to produce a mist-type body of aerosolized liquid. The nipples may be changed depending on the intended application and material to be sprayed. The liquid feed line 72 may be in fluid communication with a source of liquid, and the fluid flow rate may be between approximately 12 ounces per minute and approximately 25 ounces per minute. Although not shown in the figures, the aerosolizing nozzle 10 may include one or more filters in the proximal portion 20 of the housing 12, and/or the sprayer system 38 may include one or more filters in the liquid feed lines, to prevent clogging. The nipple 74 may extend beyond the distal face 60 to a distance at which the air exiting the air conduits 18 will impinge on the stream of liquid as it exits the nipple 74 (for example, as shown in FIGS. 5 and 6), thereby aerosolizing the liquid and propelling it away from the nozzle 10. As a non-limiting example, the nipple 74 may have a height H such that the air exiting the air conduits 18 will impinge on the stream of liquid between approximately 0.5 cm and approximately 2.5 cm beyond the nipple 74.

It should be noted that the entire nozzle housing 12 may be composed of a single piece of material, such as metal or rigid plastic. For example, the air conduits 18 and the liquid conduit 14 may be machined into the thick-walled portion 46 of the housing 12. The nipple 74 and coupling 70 may be screwed into or otherwise attached to the housing 12 after the housing 12 is manufactured. Therefore, the aerosolizing nozzle 10 described herein may be made with fewer components than currently known nozzles, offering an improved aerosolizing nozzle 10 with less cost and complexity. Further, the nozzle housing 12 may be designed such that the nozzle may be quickly and easily attached and detached from any of a variety of sprayers. Still further, the configuration of the nozzle housing 12 may effectively create a vortex 63 of air.

The introduction of a liquid into this vortex shears the liquid into aerosolized liquid particles suspended in the air, creating a mist or fog of application material, and propels the aerosolized liquid toward the plants, even without the assistance of a fan. For example, the liquid may be aerosolized into a fog with liquid particles having a mean diameter of between 10 and 30 microns, or into a mist with liquid particles having a mean diameter of between 30 and 60 microns, or into a fine spray with liquid particles having a mean diameter of between 60 microns and 150 microns. The aerosolized liquid is well suited for providing thorough, uniform coverage of all surfaces of the plant foliage, including the upper and lower surfaces of individual leaves. Further, the small particle size of the aerosolized liquid helps the liquid to stick to the leaves, and not form large liquid droplets that easily roll off, thereby not only wasting treatment liquid but also introducing an unintended amount of treatment liquid into the soil and/or water. This thorough and uniform coverage helps ensure that, for example, an insecticide will come in contact with a large portion of the target insect population or that a fungicide will treat a target pathogen on all areas of the leaf.

Figure 7A:
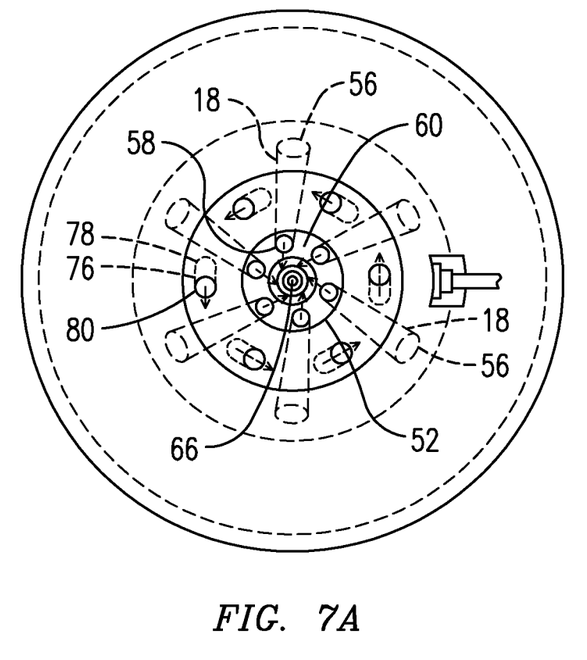
FIG. 7A shows a top view of a first version of the third embodiment of an aerosolizing nozzle.
Figure 7B:
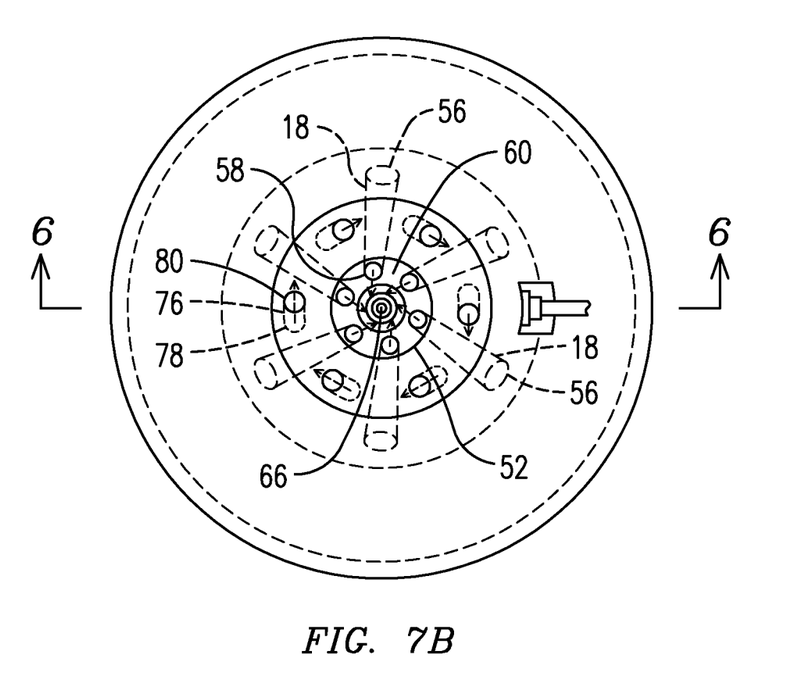
FIG. 7B shows a top view of a second version of the third embodiment of an aerosolizing nozzle.

Referring now to FIGS. 5-7B, a second embodiment and a third embodiment of an aerosolizing nozzle 10 are shown. The nozzles 10 of FIGS. 5-7B are similar in shape and function to the first embodiment of FIGS. 1-4. That is, the orientation of the air conduits 18 creates a vortex 63, which not only effectively aerosolizes the fluid by its shearing effect, but also directs the aerosolized liquid in a forward direction, toward the target plants. However, nozzles 10 shown in FIGS. 5-7B include a second plurality of air conduits in addition to the first plurality of air conduits 18. This second plurality of air conduits may be referred to as a plurality of propellant conduits 76. As shown in FIGS. 5 and 6, the propellant conduits 76 may be in fluid communication with the compressed air inlet chamber 16, as are the air conduits 18. Also like the air conduits 18, the propellant conduits 76 are radially disposed about the longitudinal axis 62 of the nozzle housing 12 and are slightly angles such that the air exits the propellant conduits 76 at a small angle that is in the same general direction as the air exiting the air conduits 18. As a non-limiting example, air may exit both the air conduits 18 and the propellant conduits 76 in a counter-clockwise direction (as shown in FIG. 7A). However, it will be understood that the air may exit both the air conduits 18 and the propellant conduits 76 in a clockwise direction. Unlike the air conduits 18, however, the propellant conduits 76 are not canted toward the longitudinal axis 62 of the nozzle housing 12; rather, the inlet 78 and the outlet 80 of each propellant conduit 76 is equidistant from the longitudinal axis 62. So, air may exit the air conduits 18 in a counter-clockwise direction and toward the liquid conduit outlet 66 in the center of the distal face 60. Conversely, although air may exit the propellant conduits 76 also in a counter-clockwise direction, the air may be directed from each propellant conduit 76 in a direction that is tangential to a circumference defined by the outlets 80 of the propellant conduits 76, rather than toward the liquid conduit outlet 66. The circumference defined by the outlets 80 of the propellant conduits 76 may be greater than the circumference defined by the outlets 58 of the air conduits 18 (for example, as shown in FIGS. 7A and 7B). Further, as noted above, the inlet 78 of each propellant conduit 76 is located a same radial distance from the longitudinal axis 62 as the corresponding outlet 80.

As described above, FIG. 7A shows a first version of a third embodiment of an aerosolizing nozzle, in which the air conduits 18 and the propellant conduits 76 are oriented such that the air exits the propellant conduits 76 at a small angle that is in the same general direction as the air exiting the air conduits 18. In contrast, FIG. 7B shows a second version of the third embodiment of an aerosolizing nozzle, in which the air conduits 18 and the propellant conduits 76 are oriented such that the air exits the propellant conduits 76 at a small angle that is generally in the opposite direction as the air exiting the air conduits 18. This counter-flow configuration of FIG. 7B may have the effect of providing additional shear to the liquid, whereas the parallel flow configuration of FIG. 7A may have the effect of propelling aerosolized liquid a greater distance than the counter-flow configuration. As a non-limiting example, the nozzle of FIG. 7A may be desirable when spraying trees, whereas the nozzle of FIG. 7B may be desirable when spraying delicate and low row crops, such as lettuces.

As shown in FIGS. 7A and 7B, the inlet 78 of each propellant conduit 76 may be radially offset from the outlet 80. For example, the propellant conduits 76 may be angled between approximately 2° and approximately 10° from being parallel to the longitudinal axis 62. This slight angle allows the flow of air from the propellant conduits 76 to be substantially laminar, while not disrupting the turbulent flow of the vortex 63. The air exiting the propellant conduits 76 may propel the aerosolized liquid exiting the nozzle toward the treatment area with more force than the air conduits 18 alone, although still more gently than with the use of a fan. For example, use of the nozzle 10 of FIGS. 5-7B may allow an applicator to effectively cover foliage of a 15-foot citrus tree even without the use of loud and cumbersome fans, as are typically used in currently known sprayer systems.

Continuing to refer to FIGS. 5 and 6, the nozzle housing 12 may include an exposed distal face 60 (as shown in FIG. 5) or a distal face 60 that is recessed relative to a nozzle outlet 52 (as shown in FIG. 6). Unlike the embodiment of FIG. 1, the nozzle 10 of FIG. 6 may not include a lipped nozzle outlet, and the inner walls of the distal compartment 50 may following the frustoconical shape of the nozzle housing 12. As a non-limiting example, the nozzle of FIG. 5 may be used when a nozzle is desired that involves lower production cost and complexity. Further, as the lipped outlet in FIG. 3, for example, may provide an additional shearing effect, the nozzle of FIG. 6 may be used when it is desirable to provide less shear to the liquid than provided by the lipped-outlet nozzle.

Referring now to FIGS. 8-11, several embodiments of a sprayer assembly including aerosolizing nozzles 10 are shown. Because of the shearing effect of the air vortex 63 at the aerosolizing nozzles 10, only a relatively small volume of liquid is required for thorough and uniform coverage of the foliage. Thus, the sprayer assembly may be referred to as a low-volume sprayer. As shown in FIG. 8, one or more aerosolizing nozzles 10 as shown and described in FIGS. 1-7 may be attached to a horizontal boom 82 for spraying low plants. As shown in FIGS. 8-10, the proximal portion 20 of the nozzle housing 12 may be attached to a compressed air feed line 42, which may, in turn, be connected to an air containment chamber or manifold 44. The sprayer system 38 may include pump which may be, for example, located in a housing. Further, at least one of the attachment tabs 36 may be used to anchor the nozzle 10 to a structure such as a boom. The sprayer assembly may further include one or more fluid reservoirs containing oil, insecticides, fungicides, or other liquid to be applied by the sprayer to the plants, and a pump for delivering the application liquid to the nozzle 10. The liquid feed line 72 is shown in FIG. 9 as passing from the air manifold 44 to the nozzle 10. In such an embodiment, the air manifold 44 may include a discrete liquid manifold within the air manifold 44, or the system 38 may include a liquid manifold located outside the air manifold 44, for example, coupled to the air manifold 44 or other system 38 component (not shown). The liquid manifold may be in fluid communication with a second liquid manifold or the liquid supply via a valve (for example, a solenoid valve). For example, the second liquid manifold, in turn, may be in fluid communication with the liquid supply. Alternatively, the liquid feed lines 72 may be attached directly to the nozzles 10 from the liquid supply (not shown). As shown in FIG. 10, one or more aerosolizing nozzles 10 may be similarly attached to a vertical boom 84 for spraying taller plants, such as trees and large shrubs. It will be understood that any number or configuration of nozzles suitable the particular application may be used.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A spray nozzle comprising:
   a frustoconical body defining a wall, a proximal portion, a distal portion, a longitudinal axis, and a face at the distal portion that is substantially orthogonal to the longitudinal axis, the body wall at the distal portion being thicker than the body wall at the proximal portion;
   a first plurality of air conduits defined by the body wall of the distal portion and arranged about the longitudinal axis, each of the first plurality of air conduits having an inlet and an outlet;
   a second plurality of air conduits defined by the body wall of the distal portion, each of the second plurality of air conduits having an inlet and an outlet, the inlet and the outlet of each of the second plurality of air conduits being equidistant from the longitudinal axis, the inlet of each of the second plurality of air conduits being circumferentially offset from a corresponding outlet of the second plurality of air conduits;
   a liquid conduit defined by the body wall of the distal portion and having an inlet and an outlet, the outlets of the first plurality of air conduits and each of the second plurality of air conduits being radially disposed about the outlet of the liquid conduit on the face of the body, wherein the liquid conduit further defines a bend, the liquid conduit being substantially orthogonal to the longitudinal axis between the liquid conduit inlet and the elbow bend, and the liquid conduit being substantially coaxial with the longitudinal axis between the elbow bend and the liquid conduit outlet; and
   wherein each inlet of the first plurality of air conduits being radially offset from a corresponding outlet of the first plurality of air conduits, the outlets of the first plurality of air conduits defining a first circumference about the outlet of the liquid conduit and the outlets of the second plurality of air conduits defining a second circumference about the outlet of the liquid conduit, the first circumference being less than the second circumference, each of the first plurality of air conduit outlets and each of the second plurality of second air conduit outlets are positioned in a common plane.

2. The spray nozzle of claim 1, wherein the body is tapered from the proximal portion to the distal portion.

3. The spray nozzle of claim 1, further comprising a liquid ejection element that is removably attached to the outlet of the liquid conduit.

4. The spray nozzle of claim 1, wherein the inlet of the liquid conduit is disposed within a lateral surface of the body.

5. The spray nozzle of claim 1, further comprising an air chamber defined by the proximal portion of the body wall.

6. The spray nozzle of claim 1, wherein the nozzle body further defines a nozzle opening that is distal of the face.

7. The spray nozzle of claim 6, wherein the nozzle opening includes a lipped region.

8. The spray nozzle of claim 1, wherein at least a portion of the proximal portion of the nozzle body is threaded.

9. The spray nozzle of claim 1, wherein the proximal portion further defines one or more attachment tabs that radially protrude from the body.

10. A spray nozzle comprising:
    a body defining a longitudinal axis, a body wall, a proximal portion, and a distal portion, the body wall at the distal portion being thicker than the body wall at the proximal portion, the body being tapered from the proximal portion to the distal portion;
    an air chamber defined by the body wall of the proximal portion;
    a plurality of air conduits defined by the body wall of the distal portion, each of the plurality of air conduits defining an air conduit inlet at a first radial distance from the longitudinal axis and defining an air conduit outlet at a second radial distance from the radial axis, the first radial distance being greater than the second radial distance, each of the air outlets being radially disposed about the longitudinal axis and each air conduit having an inlet that is radially offset from the outlet, each of the air conduits being tapered from the air conduit inlet to the air conduit outlet;
    a liquid conduit defined by the body of the distal portion, the liquid conduit defining a liquid conduit inlet, a liquid conduit outlet, and an elbow bend, the portion of the liquid conduit between the liquid conduit inlet and the elbow bend being substantially orthogonal to the longitudinal axis and the portion of the liquid conduit between the elbow bend and the liquid conduit outlet being substantially coaxial with the longitudinal axis, the outlets of the plurality of air conduits being radially arranged bout the outlet of the liquid conduit;
    a plurality of propellant conduits defined by the body wall at the distal portion, each of the plurality of propellant conduits having an inlet and an outlet, the outlets of the plurality of propellant conduits being radially disposed about the liquid conduit outlet, the outlets of the plurality of propellant conduits defining a first circumference about the liquid conduit outlet and the outlets of the plurality of air conduits defining a second circumference about the liquid conduit outlet, the second circumference being smaller than the first circumference, and the inlet and the outlet of each propellant conduit being equidistant from the longitudinal axis, each of the air conduit outlets and each of the propellant conduit outlets are positioned in a common plane.

11. A method of aerosolizing a liquid, the method comprising:
    providing a nozzle, the nozzle including:
    a frustoconical body defining a longitudinal axis, a wall, a proximal portion, and a distal portion, the body wall at the distal portion being thicker than the body wall at the proximal portion;
    an air chamber defined by the body wall of the proximal portion;

a plurality of air conduits defined by the body wall of the distal portion and being in communication with the air chamber, each air conduit having an inlet and an outlet;

a liquid conduit defined by the body wall of the distal portion and having an inlet at a first radial distance from the longitudinal axis and an outlet at a second radial distance from the longitudinal axis, the first radial distance being greater than the second radial distance, the outlets of the plurality of air conduits being radially disposed about the outlet of the liquid conduit, inlet of each of the plurality of air conduits being radially offset from the outlet of the air conduit, the liquid conduit defining an elbow bend, the portion of the liquid conduit between the liquid conduit inlet and the elbow bend being substantially orthogonal to the longitudinal axis and the portion of the liquid conduit between the elbow bend and the liquid conduit outlet being substantially coaxial with the longitudinal axis; and a plurality of propellant conduits defined by the body wall of the distal portion, each of the plurality of propellant conduits having an inlet and an outlet, the outlets of the plurality of propellant conduits being radially disposed about the outlet of the liquid conduit, the outlets of the plurality of propellant conduits defining a first circumference about the outlet of the liquid conduit and the outlets of the plurality of air conduits defining a second circumference about the outlet of the liquid conduit, the second circumference being smaller than the first circumference, and the inlet and the outlet of each propellant conduit being equidistant from the longitudinal axis, each of the air conduit outlets and each of the propellant conduit outlets are positioned in a common plane; and expelling liquid from the liquid conduit outlet; and expelling air from the outlets of the plurality of air conduits, the plurality of air conduits rotationally expelling the air into the liquid.

* * * * *